Patented June 7, 1932

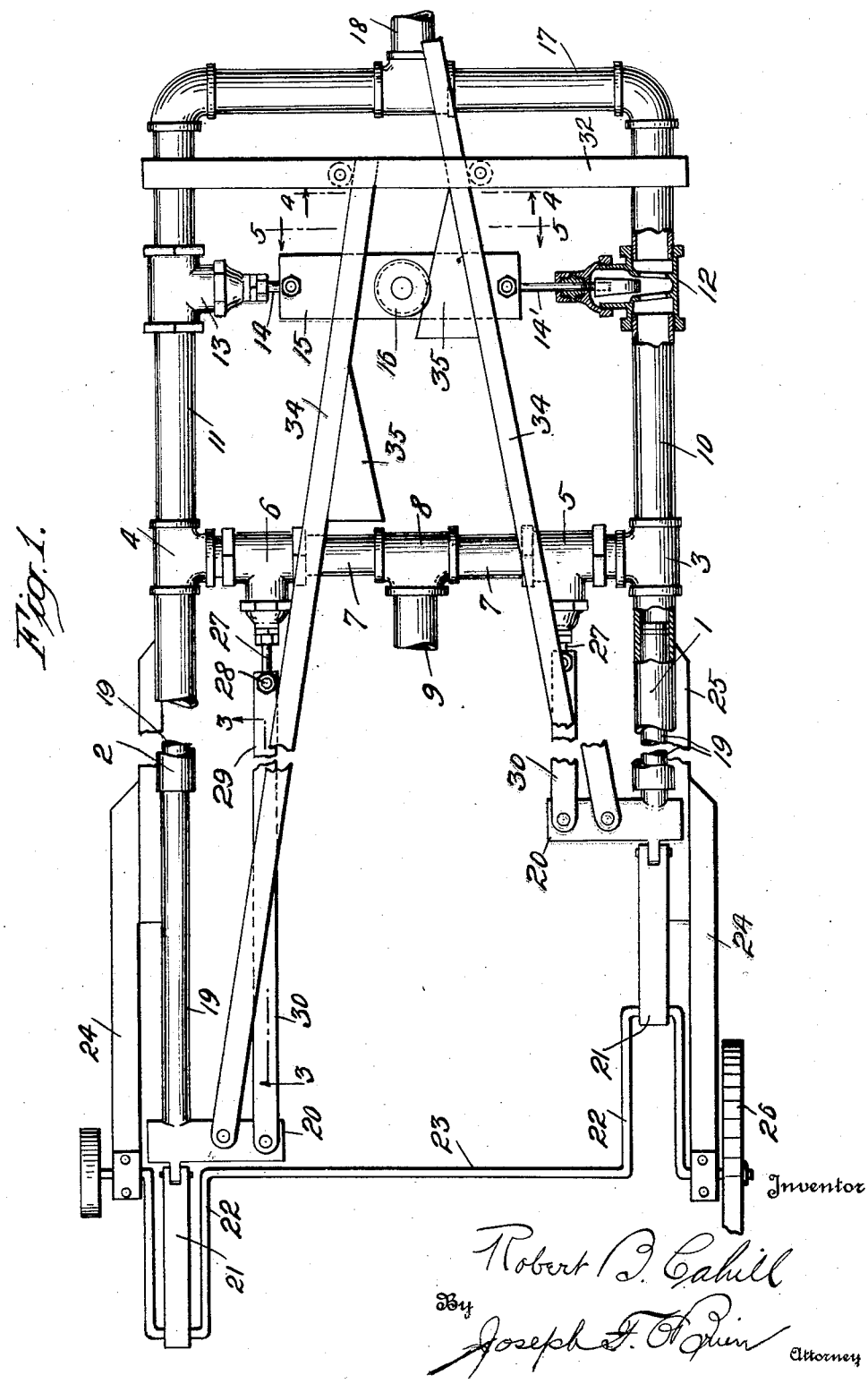

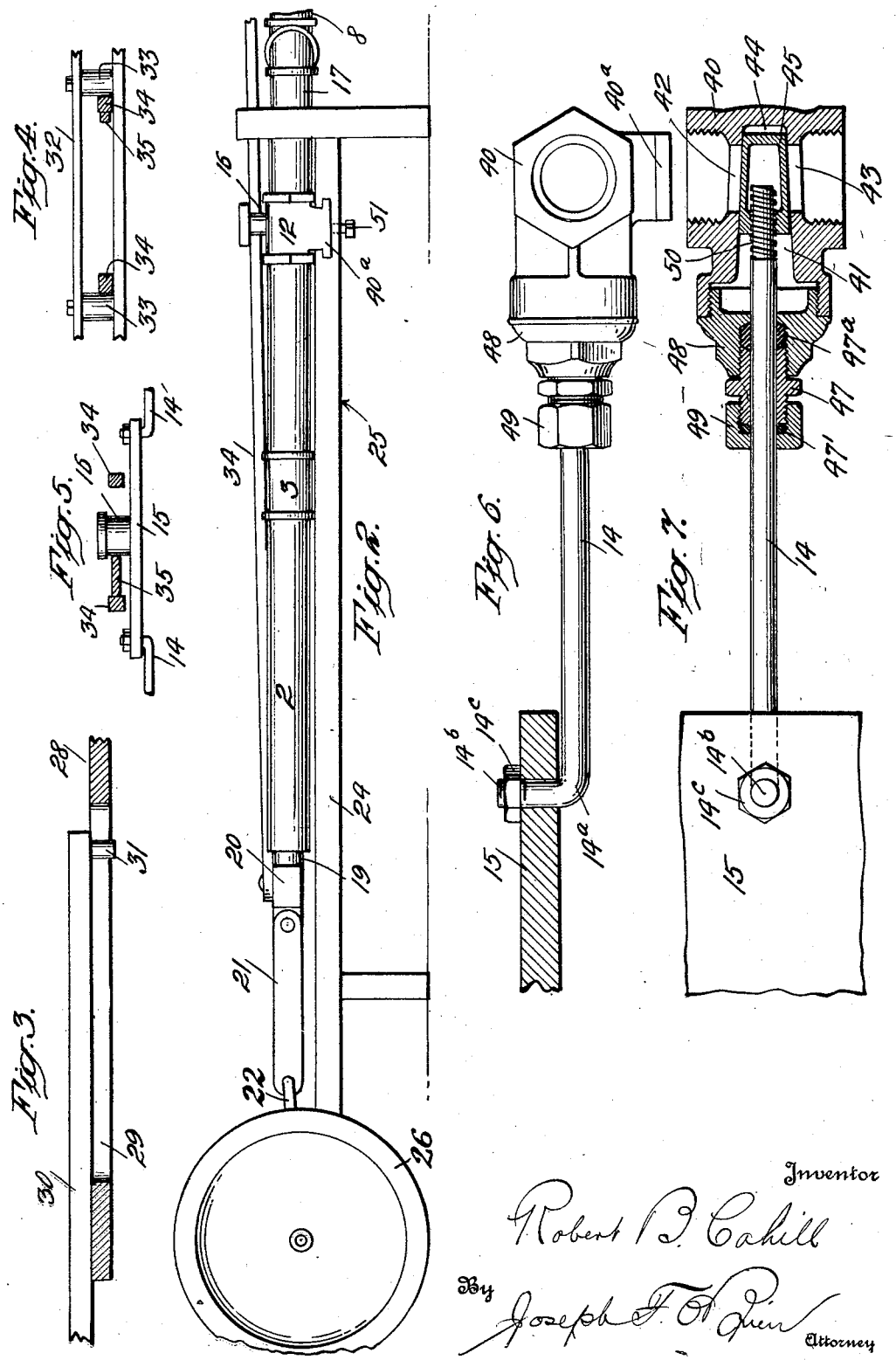

1,861,951

UNITED STATES PATENT OFFICE

ROBERT B. CAHILL, OF UPPER MACOPIN, NEW JERSEY

LIQUID MOTOR

Application filed October 1, 1927. Serial No. 223,312.

This invention relates to improvements in motors and valves.

One of the objects of this invention is to produce a device of this character so constructed that motive fluid under pressure can be introduced into the motor to reciprocate the pistons thereof in order to impart rotary movement to the driving shaft.

Another object of the invention is to provide a device of this kind which is extremely simple in construction, efficient in operation and one which will produce a maximum amount of power with a minimum amount of motive fluid.

Still another object of my invention is to produce a valve capable of use in my novel motor which will provide for a sliding movement of the valve member in relation to the casing to open and close the fluid passage therethrough and will also provide adjustable means on the stem for varying the steady stroke of the valve member and enabling the valve member to be adjusted in relation to the casing.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a plan view of the device;

Fig. 2 is a side elevation thereof;

Fig. 3 is a sectional view on the line 3—3 of Fig. 1;

Fig. 4 is a sectional view on the line 4—4 of Fig. 1;

Fig. 5 is a sectional view on the line 5—5 of Fig. 1;

Fig. 6 is a view in side elevation of one of my valves having its stem connected to a connecting plate; and Fig. 7 is a central section through the valve shown in Fig. 6.

The motor comprises a pair of cylinders 1 and 2, the forward ends thereof having connected thereto unions 3 and 4, respectively, said unions having coupled thereto exhaust valves 5 and 6. Leading from the respective valves are pipe sections 7 which communicate with a union 8 provided with an exhaust pipe 9. Fitted to the unions 3 and 4 are fluid conducting pipes 10 and 11, provided, respectively, with valves 12 and 13, said valves having their stems 14', 14 connected to the ends of a plate 15, said plate having a roller 16 journaled centrally thereof, the purpose of which will be later explained.

The valves 12 and 13 are in communication with a pipe assembly 17 which includes an inlet pipe 18 which may lead from a source of compressed air or water under pressure.

Slidable in the cylinders 1 and 2 are pistons 19, the rear ends of which are provided with blocks 20 and to which are pivotally connected the forward ends of the links 21, the rear ends of which are pivotally connected to the crank arms 22 of the crank shaft 23, said shaft being journaled in the side sills 24 of the supporting frame 25. To one end of the shaft 23 is fixed a fly-wheel 26.

The stems 27 of the valves 5 and 66 have connected thereto the forward ends of the bars 28, which are provided with longitudinal slots 29, and slidable upon said bars are straps 30, the rear ends of which are connected to the blocks 20. The straps 30 have their forward ends provided with lugs 31 which slidably engage in the slots 29 of the bars 28, as clearly illustrated in Fig. 3 of the drawings.

The frame 25 supports a transverse guide 32 which supports spaced rollers 33, said rollers serving to control the sliding movement of the valve tripping rods 34. These rods have their inner ends pivotally connected to the blocks 20 and fixed to said rods are triangular shaped blocks 35 which are adapted to alternately engage the roller 16 of the plate 15 to shift said plate, thereby alternately opening and closing the valves 12 and 13.

Briefly, the operation is as follows:

Fluid under pressure enters the pipe 18 from a suitable source, and as shown in Fig. 1, the right hand block 35 has shifted the plate 15 to the left, thereby opening the valve 12 and closing the valves 5 and 13, thus permitting the fluid to exert force upon the piston in the cylinder 2 to force the same rearwardly, thereupon the left hand bar 34 will move rearwardly and rotary movement to the shaft 23 will be imparted through the pistons 19, links 21 and cranks 22. As this bar 34 moves rearwardly the lugs 31 of the associated straps 30 will engage the rear end of the slot 29, thus opening the valve 5 and permitting the fluid to exhaust through the pipe 9. Obviously, as the left bar 34 moves rearwardly, the right hand bar 34 will move forwardly until the block 35 thereof encounters the roller 16, whereupon the plate 15 is shifted to the left in order to open the valve 13 and close the valves 12 and 6, and permitting the fluid to exert force upon the piston in the cylinder 1. As the left hand bar 34 moves forwardly, the lug 31 of the strap 30 will engage the front wall of the slot of the bar 28, thus closing the valve 6 to permit the fluid passing to the valve 13 to exhaust. As the pistons 19 are alternately reciprocated, power will be imparted to the shaft 23.

In Figs. 6 and 7, I have shown an improved valve construction which is capable of use as the inlet and exhaust valves in the motor hereinabove described. The preferred form of my valve comprises a valve casing 40, having a centrally-disposed valve chamber 41 communicating, as shown, at opposite sides with fluid passages 42, 43 between which is formed a valve seat 44, a valve member 45 being adapted to be slidably reciprocated within the chamber 41 and to close and open the fluid passages 42 and 43 respectively. Said valve member 45 is reciprocated by the stem 14 sliding within an externally screw-threaded nut 47 which is packed at opposite ends as at 47′, 47ᵃ and engages at one side with a top section 48 having a screw-threaded engagement with the casing 40 and at the other side with an internally screw-threaded packing cap 49. The valve member 45 is adjustable in relation to the stem 14 and to its seat 44 by means of an elongated screw connection 50 and said valve is, as aforesaid, reciprocable in the casing by the elongated stem 14 which, as illustrated, is provided at its outer end with an elbow 14ᵃ and the end 14ᵇ of which is passed through the connection plate 15 and fastened thereto by a nut 14ᶜ.

The valve casing 40 is also preferably provided with a flanged base member 40ᵃ which is connected to the frame by a bolt 51.

From the above it will be seen that I have provided a fluid valve which is not only capable of being opened and closed through a sliding movement of the valve stem, but the valve member is also capable of accurate adjustment in relation to its stem and seat by a relative turning movement of the valve member and valve stem, and also that I have provided means on the valve for supporting and steadying the same on the frame of the motor.

Having thus described my invention, I claim:

1. A motor of the class described comprising a pair of cylinders, pistons reciprocable therein, exhaust valves communicating with the cylinders, a pipe assembly communicating with the cylinders, valves in the assembly, a pressure fluid inlet for the assembly, bars connected with the pistons for controlling the valves of the pipe assembly, straps connected with the pistons for controlling the exhaust valves, the parts comprising a double unit and said bars and straps being arranged to operate simultaneously to open the inlet valve and to close the outlet valve at one side and also simultaneously to close the inlet valve and open the outlet valve at the opposite side, and a crank shaft connected with the pistons.

2. A motor of the class described comprising a pair of cylinders, pistons reciprocable in the cylinders, exhaust valves connected with the cylinders, a pipe assembly connected with the cylinders, a pair of oppositely arranged valves in the assembly, stems for the valves, a plate connecting the stems, bars reciprocable with the pistons, wedges on the bars for shifting the plate in opposite directions to control the opening and closing of the valves in the pipe assembly, straps operable by the pistons for controlling the opening and closing of exhaust valves, a pressure fluid inlet for the pipe assemblage, and a crank shaft operable by the pistons during their reciprocation.

In witness whereof, I have signed my name to the foregoing specification.

ROBERT B. CAHILL.